No. 802,005. PATENTED OCT. 17, 1905.
W. C. LYON.
METALLIC TREAD FOR RESILIENT TIRES.
APPLICATION FILED DEC. 16, 1904.
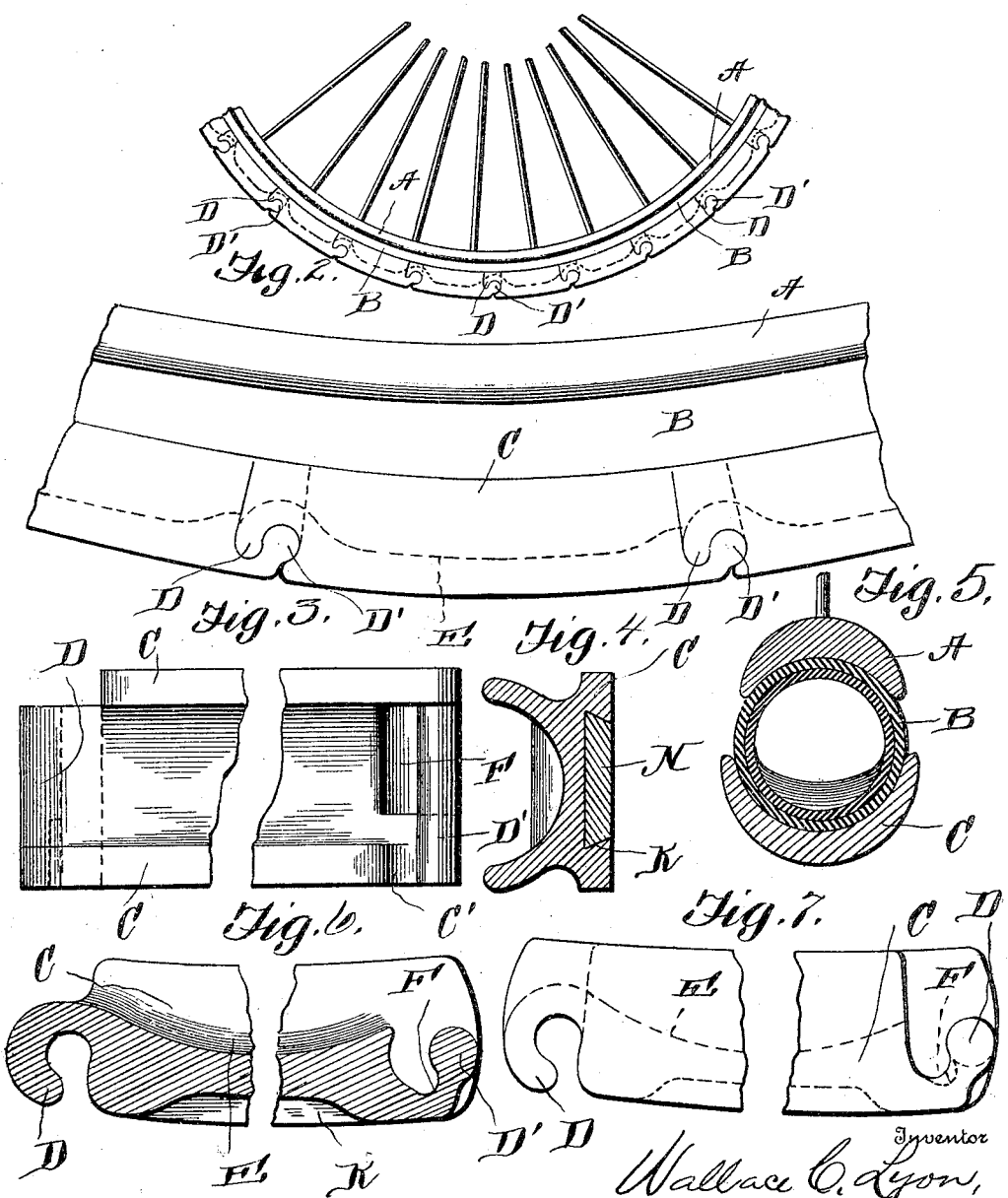

UNITED STATES PATENT OFFICE.

WALLACE C. LYON, OF HYATTSVILLE, MARYLAND.

METALLIC TREAD FOR RESILIENT TIRES.

No. 802,005.　　　Specification of Letters Patent.　　　Patented Oct. 17, 1905.

Application filed December 16, 1904. Serial No. 237,173.

*To all whom it may concern:*

Be it known that I, WALLACE C. LYON, a citizen of the United States, residing at Hyattsville, in the county of Prince George and State of Maryland, have invented certain new and useful Improvements in Metallic Treads for Resilient Tires; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to new and useful improvements in metallic treads for flexible tires for wheels; and it consists in the provision of means whereby a tire may be protected from punctures, cuts, wear, &c.

More specifically the invention comprises a metallic tread made up of interlocking links or sections which is adapted to be placed about a tire and so arranged as to protect the flexible tire from wear.

The invention consists, further, in various details of construction and combinations and arrangements of parts, which will be hereinafter fully described and then specifically defined in the appended claims.

My invention is illustrated in the accompanying drawings, which, with the letters of reference marked thereon, form a part of this application, and in which drawings—

Figure 1 is a side elevation of a portion of a wheel, showing my tire-protecting device as applied thereto. Fig. 2 is an enlarged detail view showing in elevation a portion of the tire-protector. Fig. 3 is a top plan view of one of the links of the tire-protector. Fig. 4 is a cross-sectional view of one of the links. Fig. 5 is a detail view in section of a slight modification. Fig. 6 is a central longitudinal view through one of the links, and Fig. 7 is an enlarged detail in elevation of a link.

Reference now being had to the details of the drawings by letter, A designates the rim of a wheel having a tire B, which may be either pneumatic, flexible, or solid.

C designates links of a chain which forms a tread for the tire. Each of said links, which are made of metal, is provided with a hook D at one end and a cross-piece or pin D' at the opposite end, while a space intermediate the ends is concaved, as at E, for the reception of the tire. A sinkage F is formed in the link adjacent to the pin D, and one side of each link is cut away, as at C', for the purpose of facilitating the interlocking of the links of the chain forming the tread and for the purpose of holding the links from lateral movement. The bottom of each link is slightly convexed longitudinally and recessed, as at K, a sectional view through said recessed portion being shown in Fig. 4 of the drawings, in which the opposite edges of the recess are inclined, forming a dovetailed connection with a filling N, which may be of metal or other substance, to form a non-slipping contact-surface.

In Fig. 5 of the drawings I have shown a slight modification of my invention in which the tire-protecting device has a convexed bottom instead of flat, as shown in Fig. 4 of the drawings, and said modified form is shown as applied to a pneumatic tire, but not to be so limited.

By the provision of the means shown it will be observed that a metallic tread is provided which may be easily and quickly applied to any kind of a resilient tire and so constructed that the parts are interchangeable, making it possible to exchange the links, if desired, for any purpose.

While I have shown a particular construction of apparatus embodying the features of my invention, it will be understood that I may vary the same as to details, if desired, without in any way departing from the spirit of the invention.

Having thus fully described my invention, what I claim as new, and desire to secure by Letters Patent, is—

1. A tire-protecting device comprising a series of interchangeable links, each having a hook at one end and a pin at the opposite end with an indenture adjacent to said pin, the inner face of each link being concaved, said links adapted to be interlocked and form an endless chain, as set forth.

2. A tire-protecting device comprising a series of interchangeable links, each having a hook at one end and a pin at the opposite end with an indenture adjacent to said pin, the inner face of each link being concaved, said links adapted to be interlocked and form an endless chain, the under surface of each link being recessed out, and a filling in each recess, as set forth.

3. A tire-protecting device comprising a series of links, each having a hook at one end and a pin at the opposite end, the inner face of each link being concaved, said links adapted to interlock and form an endless chain, the outer surface of each link being recessed out, and a filling in each recess, as set forth.

4. A device for protecting tires comprising a series of interlocking links adapted to surround the tire, each link being concaved on one face and provided with an integral hook at one end, the opposite end of the link having a transverse pin, the side wall of each link being cut away adjacent to said pin, as shown and described.

In testimony whereof I hereunto affix my signature in presence of two witnesses.

WALLACE C. LYON.

Witnesses:
 A. L. HOUGH,
 FRANKLIN H. HOUGH.